(12) United States Patent
Kim

(10) Patent No.: US 9,515,735 B2
(45) Date of Patent: Dec. 6, 2016

(54) DEVICE FOR CONTROLLING POLARIZATION OF OPTICAL FIBER AND METHOD OF CONTROLLING POLARIZATION OF OPTICAL FIBER USING SAME

(71) Applicant: KS Photonics Inc., Daejeon (KR)

(72) Inventor: Young Kie Kim, Daejeon (KR)

(73) Assignee: KS PHOTONICS INC., Daejeon (KR)

( * ) Notice: Subject to any disclaimer, the term of this patent is extended or adjusted under 35 U.S.C. 154(b) by 65 days.

(21) Appl. No.: 14/583,973

(22) Filed: Dec. 29, 2014

(65) Prior Publication Data

US 2016/0191162 A1 Jun. 30, 2016

(51) Int. Cl.
| H04B 10/00 | (2013.01) |
| H04B 10/2569 | (2013.01) |
| G02B 6/27 | (2006.01) |
| H04B 10/079 | (2013.01) |

(52) U.S. Cl.
CPC ......... *H04B 10/2569* (2013.01); *G02B 6/2726* (2013.01); *G02B 6/2793* (2013.01); *H04B 10/0799* (2013.01)

(58) Field of Classification Search
USPC ........................................ 398/9–38; 385/140
See application file for complete search history.

(56) References Cited

U.S. PATENT DOCUMENTS

| 4,389,090 | A | | 6/1983 | LeFevre | |
| 4,793,678 | A | * | 12/1988 | Matsumoto | G02B 6/105 359/489.01 |
| 6,282,333 | B1 | * | 8/2001 | Dultz | H04B 10/2569 385/11 |
| 6,480,637 | B1 | | 11/2002 | Yao | |
| 7,158,275 | B2 | * | 1/2007 | Schenker | G02F 1/0131 250/227.17 |
| 8,958,060 | B2 | * | 2/2015 | Chen | G01M 11/088 356/73.1 |
| 2005/0225829 | A1 | * | 10/2005 | Schenker | G02F 1/0131 359/251 |
| 2014/0233019 | A1 | * | 8/2014 | Chen | G01M 11/088 356/73.1 |

FOREIGN PATENT DOCUMENTS

JP 2003-121762 4/2003

* cited by examiner

*Primary Examiner* — Agustin Bello
(74) *Attorney, Agent, or Firm* — Kile Park Reed & Houtteman PLLC

(57) ABSTRACT

A device for controlling polarization of an optical fiber and a method of controlling the polarization of an optical fiber using the same are disclosed herein. The device includes optical fiber supports, an optical fiber holder, and an optical fiber curvature changing unit. The optical fiber supports receive an optical fiber, and support both ends of the optical fiber. The optical fiber holder includes an optical fiber guide element that guides the optical fiber, drawn out of the optical fiber supports, through a path. The optical fiber curvature changing unit is located between the optical fiber and the optical fiber guide element, and changes the curvature of the optical fiber by exerting external force onto the optical fiber.

9 Claims, 6 Drawing Sheets

DEVICE FOR CONTROLLING POLARIZATION OF OPTICAL FIBER AND METHOD OF CONTROLLING POLARIZATION OF OPTICAL FIBER USING SAME

BACKGROUND

1. Technical Field

The present invention relates generally to a device for controlling the polarization of an optical fiber and a method of controlling the polarization of an optical fiber using the same. More particularly, the present invention relates to a device for controlling the polarization of an optical fiber, which is capable of controlling both the amounts of and phase difference between the polarization components of light guided through an optical fiber, and a method of controlling the polarization of an optical fiber using the same.

2. Description of the Related Art

In many cases, the performance of communication using an optical fiber is dependent upon the polarization of light. Devices that are sensitive to polarization include various devices, including a wavelength multiplexer, a converter, a modulator, an amplifier and a receiver.

For example, in the case of a standard single mode optical fiber, the polarization state of light propagating through the optical fiber changes due to unavoidable thermal or mechanical stress during the manufacture thereof and the irregular sizes of some imperfect optical fiber cores. Furthermore, this change is also influenced by an external environment in which the optical fiber is located. Accordingly, the state of polarization is random and may change over time. This brings about a so-called polarization-mode dispersion (PMD) phenomenon that causes pulse dispersion and signal distortion that cannot be easily resolved while a signal is propagating through the optical fiber.

A device for controlling the polarization of an optical fiber is a device that controls the state of polarization so that a desired state can be achieved at the output end of an optical fiber using a controllable and reliable method in order to overcome the above-described disadvantages.

One of the main principles of a device for controlling the polarization of an optical fiber is to change the double refraction state of the material of an optical fiber. In general, double refraction refers to a phenomenon in which light is branched into two paths and propagates along the two paths inside a medium. This phenomenon occurs because a medium has different refractive indices depending on the polarization direction of light. A polarization component that propagates along a slow axis having a high refractive index has a slow phase speed and is thus phase-delayed, and a polarization component that propagates along a fast axis having a low refractive index has a high phase speed and is thus phase-advanced.

A medium configured such that the phase difference between two axes is maintained at a half wavelength is a half-wave phase delay plate, and a medium configured such that the phase difference between two axes is maintained at a ¼ wavelength is a ¼ wave phase delay plate. Double refraction is found in an optical fiber. Although double refraction may be caused by the asymmetry of an optical fiber core, a more important reason why double refraction occurs in an optical fiber is stress that is exerted on the optical fiber during the manufacture thereof.

An ideal device for controlling the polarization of an optical fiber prevents a coupling between two orthogonal polarization directions, thereby intentionally generating a double refraction pattern over the length of an optical fiber. The double refraction effect generated as described above is considerably higher than an indispensable polarization effect that causes a PMD effect, with the result that it becomes possible to perform control so that a desired polarization state is achieved at the output end of an optical fiber.

Furthermore, in order to generate high double refraction, a device for controlling the polarization of an optical fiber, which is capable of introducing high stress in a single direction based on the geometrical shape and material of an optical fiber, is desirable.

A conventional device for controlling the polarization of an optical fiber is constructed by applying the principle of a wave plate, that is, a phase delay plate. As illustrated in FIG. 8, an optical fiber coil 10' corresponding to a half-wave phase delay plate is disposed at the center of a path between the input and output lines of an optical fiber, and coils 20' and 30' corresponding to ¼ wave phase delay plates are disposed beside the optical fiber coil 10'. During the process of bending an optical fiber so that the optical fiber forms a coil shape, stress is introduced.

As is well known, the ¼ wave phase delay plate converts arbitrary input polarized light into linear (plane) polarized light, and the half-wave phase delay plate can rotate arbitrary linear polarized light by a desired angle. Accordingly, when linear polarized light is passed through the ¼ wave phase delay plate, the half-wave phase delay plate and again the ¼ wavelength phase delay plate, the linear polarized light can be converted into any desired polarization state.

The conventional device applies tensional pressures having different magnitudes in a bending direction and a direction perpendicular to the bending direction by bending an optical fiber, thereby generating double refraction. This operation is based on the principle that the magnitude of double refraction varies depending on a bending curvature radius (the square of a curvature radius is inversely proportional to the difference in refractive index). The fact that the absolute value of the difference in double refraction is controlled means that the absolute value of the phase difference that is experienced by respective polarization components having passed through two axes, that is, slow and fast axes, can be controlled. U.S. Pat. No. 4,389,090 discloses a double refraction effect that is introduced into a coil-shaped optical fiber.

Another important principle of the device for controlling the polarization of an optical fiber is to control the amount of polarized light incident on slow and fast axes by controlling the angle of incident polarized light with respect to the double refraction axis of a medium.

Accordingly, when the angles of arrangement of coils are controlled by rotating three coils 10', 20' and 30' by the angles in the directions of the arrows using an optical fiber path axis a' as a reference axis in FIG. 8, the quantities of polarization components propagating along the two axes can be controlled under a fixed wavelength condition.

Meanwhile, according to the conventional technology, since the curvature radius of the coils that form loops is fixed, inconvenience is incurred in that another phase delay plate should be newly installed and the angles should be controlled again when an optical fiber having a different wavelength is employed.

Another conventional technology is a technology using a squeezer.

For example, U.S. Pat. No. 6,480,637 discloses a technology in which multiple high-precision grinding surfaces driven by piezoelectric elements are arranged and stress is introduced into an optical fiber by applying squeeze to the optical fiber. Wave plates are biased by 45° with respect to each other, and the delay of each wave plate component varies depending on the pressure of each optical fiber squeezer. However, this device is disadvantageous in that the durability thereof is poor, the volume thereof is large and the cost thereof is high.

Furthermore, a device commercialized as a Babinet-Soleil compensator is configured to generate linear double refraction by applying pressure to an optical fiber using an actuator via a squeezer rotating around the optical fiber and to fabricate an optical fiber wave plate having a delay factor that varies depending on a change in the pressure. However, in spite of the advantage of being applied to a wide variety of optical fibers, this device is disadvantageous in that the durability thereof is poor because the device employs a method of applying pressure directly to an optical fiber and in that it is difficult to control accuracy because a wide variety of optical fibers should be processed depending upon a single squeezer.

SUMMARY

At least some embodiments of the present invention are directed to the provision of a device for controlling the polarization of an optical fiber, which has a new design and is capable of stably and intuitively controlling the polarization of light that is wave-guided through an optical fiber, and the provision of a method of controlling the polarization of an optical fiber using the device.

At least some embodiments of the present invention are directed to the provision of a device for controlling the polarization of an optical fiber, the device being capable of controlling the difference between the phases of polarization components and controlling the amounts of polarization components through double refraction, which is configured in an integrated manner and is capable of functioning as a plurality of phase delay plates, and the provision of a method of controlling the polarization of an optical fiber using the device.

At least some embodiments of the present invention are directed to the provision of a device for controlling the polarization of an optical fiber, which can overcome the conventional limitation in which another type device for controlling the polarization of an optical fiber is required for a different light wavelength and can implement all polarization modes for cutoff wavelengths propagating through an optical fiber using a single device, thereby achieving excellent durability and adaptability and excellent marketability attributable to compact design and assembly, and the provision of a method of controlling the polarization of an optical fiber using the device.

In accordance with an aspect of the present invention, there is provided a device for controlling polarization of an optical fiber, including optical fiber supports configured to receive an optical fiber and support both ends of the optical fiber; an optical fiber holder configured to include an optical fiber guide element that guides the optical fiber, drawn out of the optical fiber supports, through a path; and an optical fiber curvature changing unit located between the optical fiber and the optical fiber guide element, and configured to change the curvature of the optical fiber by exerting external force onto the optical fiber.

The optical fiber curvature changing unit may include rods inserted into the optical fiber guide elements and configured to protrude.

The optical fiber holder may include slots; and the optical fiber curvature changing unit may include movable members that are inserted into the slots and are movable along the shapes of the slots.

The optical fiber curvature changing unit may further include connection members configured such that first ends thereof are connected to the movable members, respectively; and a movable member location changing unit connected to second ends of the connection members, and configured to move the movable members by changing locations of the connection members.

The optical fiber guide element may be formed in a circular or elliptical shape.

The optical fiber holder may further include rotation pins that connect the optical fiber supports and the optical fiber holder and are rotatable around a support axis of the optical fiber supports.

In accordance with an aspect of the present invention, there is provided a communication system, including a device for controlling polarization of an optical fiber, including optical fiber supports configured to receive an optical fiber and support both ends of the optical fiber; an optical fiber holder configured to include an optical fiber guide element that guides the optical fiber, drawn out of the optical fiber supports, through a path; and an optical fiber curvature changing unit located between the optical fiber and the optical fiber guide element, and configured to change a curvature of the optical fiber by exerting external force onto the optical fiber; a transmitter; one or more communication components subjected to suffering from polarization loss; a monitoring device configured to monitor optical output that passes the communication components; and a feedback circuit configured to receive a signal from the monitoring device and control the device for controlling the polarization of an optical fiber based on the signal.

In accordance with another aspect of the present invention, there is provided a device for controlling polarization of an optical fiber, including a first polarization control unit configured to comprise an optical fiber guide element that guides the optical fiber along a path and bend the optical fiber; and a second polarization control unit configured to apply additional stress by additionally bending the optical fiber during a bending operation of the first polarization control unit.

In accordance with still another aspect of the present invention, there is provided a method of controlling polarization of an optical fiber, including a first polarization control step of applying stress by bending an optical fiber in a substantially circular or elliptical shape; and a second polarization control step of applying additional stress by additionally bending the optical fiber during a bending operation of the first polarization control step.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

The present invention is intended to the provision of a device that can overcome the conventional limitation in which another type device for controlling the polarization of an optical fiber is required for a different light wavelength and can implement all polarization modes for cutoff wavelengths propagating through an optical fiber using a single device.

In the present invention, an optical fiber includes a single mode optical fiber, but is not limited thereto. Furthermore, in the present invention, the optical fiber includes any types of optical fibers, including not only an optical fiber used in the core of the conventional technology but also a polarization-maintaining optical fiber capable of generating strong double refraction because it is rarely influenced by a non-linear polarization effect.

A device for controlling the polarization of an optical fiber requires a part for controlling the quantities of polarization components and a part for controlling the degree of phase difference between the polarization components.

Figure 1:
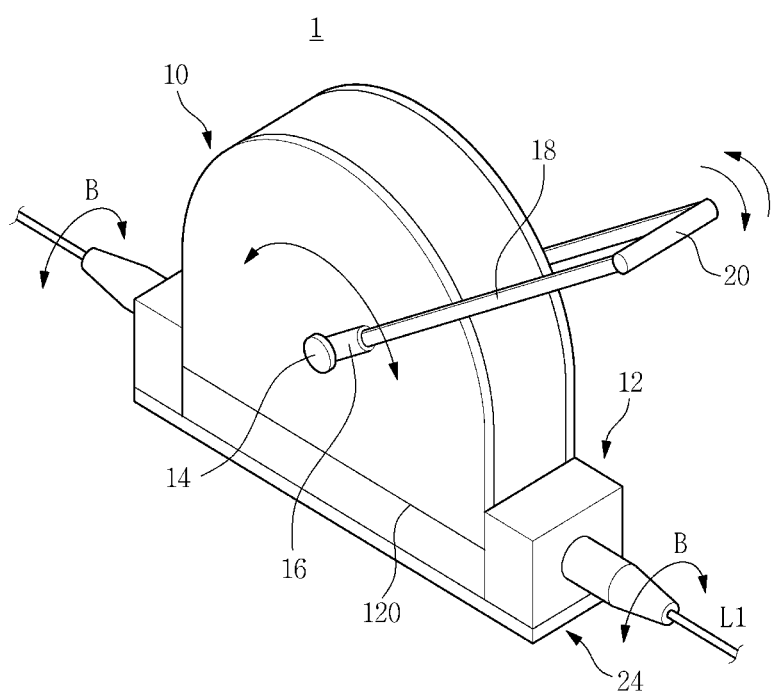
FIG. 1 is a perspective view illustrating the overall appearance of a device for controlling the polarization of an optical fiber according to an embodiment of the present invention.

FIG. 1 is a perspective view illustrating the overall appearance of a device 1 for controlling the polarization of an optical fiber according to an embodiment of the present invention.

The device 1 for controlling the polarization of an optical fiber according to the present invention is symmetrical with respect to a vertical center axis. Accordingly, the following description will be given chiefly based on the left configuration thereof, and the right configuration thereof will be assigned the same reference numerals and a detailed description thereof will be omitted.

The device 1 for controlling the polarization of an optical fiber includes an optical fiber holder 10 configured such that the upper part thereof is arch-shaped and the lower part thereof is a rectangular frame, and pin holders 12 disposed at lower locations on the left and right sides of the optical fiber holder 10, respectively.

On the front of the illustrated device 1 for controlling the polarization of an optical fiber, a rotation shaft 14 protrudes via a through hole located at about the center of the optical fiber holder 10, and shaft holders 16 that accommodate the rotation shaft 14 are connected to the ends of a knob 20, that is, an operation member, via connection rods 18. The connection rods 18 have a length sufficient to protrude from the optical fiber holder 10 to the outside thereof.

Furthermore, the knob 20 has a length larger than the width of the optical fiber holder 10. Since the device 1 for controlling the polarization of an optical fiber according to the present embodiment employs the same structure in the back of the device 1 that is not illustrated, the knob 20 can be freely rotated around the rotation shaft 14 via the connection rods 18 connected to both ends of the knob 20 without interference with the optical fiber holder 10 when the knob 20 is rotated by the hand clockwise or counterclockwise, as indicated by the arrows in the diagram.

In the present embodiment, the pair of left and right pin holders 12 may be integrated with the optical fiber holder 10, or may be separately fabricated and then combined with the optical fiber holder 10. Both sides of the optical fiber holder 10 are supported by the pin holders 12, and the bottom 120 thereof is disposed not to interfere with the base 24.

Figure 2:
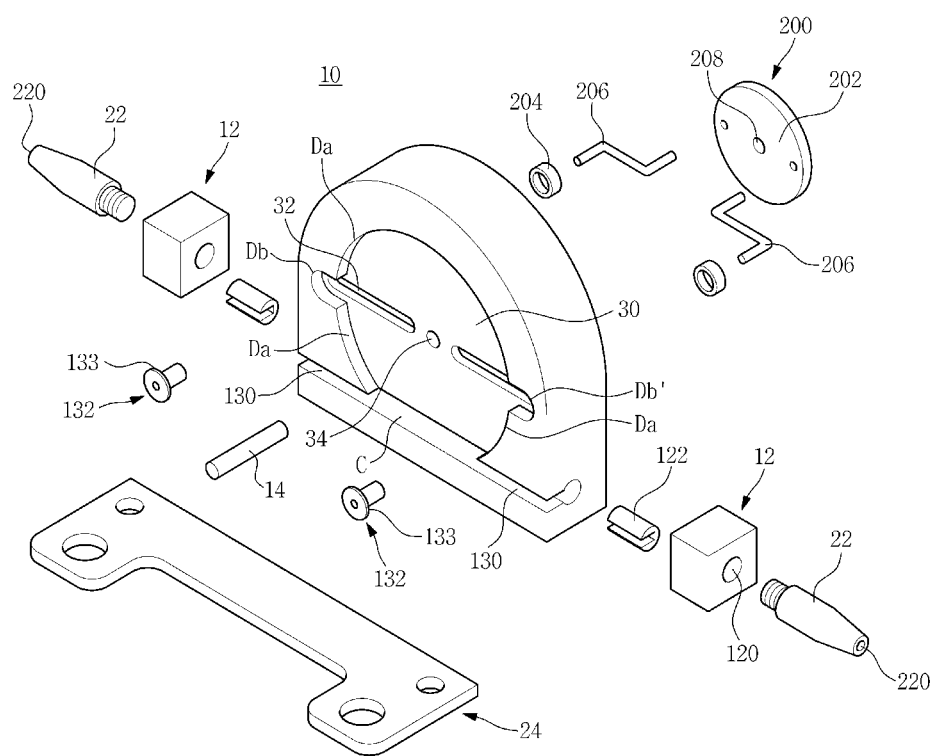
FIG. 2 is an assembly view illustrating the device for controlling the polarization of an optical fiber according to the embodiment of the present invention with the optical fiber holder thereof cut along the center of thereof.

Referring to FIGS. 1 and 2 together, an approximately sideways U-shaped rotation pin 122 is inserted via a through hole formed in the upper center of the pin holder 12, and a truncated conical strainer 22 is inserted from the outside of the pin holder 12 opposite the rotation pin 122. The exit hole 220 of the strainer 22 communicates with the open slit of the rotation pin 122 via a linear hole extending through the center of the strainer 22 in the lengthwise direction thereof.

The strainer 22 according to the present embodiment functions as an optical fiber support that supports both ends of an inserted optical fiber.

The rotation pin 122 can be rotated around the support axis of the strainer 22, and connects the strainer 22 and the optical fiber holder 10.

The optical fiber is introduced through the left strainer 22 and the left pin holder 12, passes through the optical fiber holder 10 located in the middle of the device 1, and then extends to the outside through the right pin holder 12 and the right strainer 22.

Accordingly, the left and right pin holders 12, the left and right rotation pins 122 and the left and right strainers 22 according to the present embodiment function to guide the introduction and output portions of an optical fiber that is bent to form a loop-shaped circular coil while passing through the optical fiber holder 10 while stably supporting them.

Referring back to FIG. 1, the overall bottom of the pin holder 12 according to the present embodiment is firmly fastened to the oblong base 24. Furthermore, as described above, the bottom 120 of the optical fiber holder 10 is spaced apart from the base 24 by a predetermined interval. Accordingly, the optical fiber holder 10 can be rotated around the support axis L1 of the drawing in arrow direction B illustrated in the drawing. Furthermore, when the optical fiber holder 10 is rotated around the arrow direction B of the drawing, the optical fiber may be twisted.

As is well known, when the optical fiber is bent on the optical fiber holder 10 to form a coil, the material of the optical fiber is subjected to stress and double refraction is caused by the photoelastic effect, and a twist in the optical fiber attributable to the rotation of the optical fiber holder 10 also brings about a change in a change in polarization.

As described above, although the optical fiber holder 10, the pin holders 12 and the base 24 complete the device 1 for controlling the polarization of an optical fiber according to the present embodiment as a single set as a whole, it will be apparent that the shape, size and location of each part may be changed as required.

The device 1 for controlling the polarization of an optical fiber according to the present embodiment may be fabricated in a small size such that the overall length of the base 24 is about 60 mm and the overall height of the optical fiber holder 10 is 40 mm.

Next, the structure of the optical fiber holder 10 according to the present embodiment is described with reference to FIG. 2. FIG. 2 is an exploded perspective view illustrating the optical fiber holder 10 of FIG. 1 according to the present embodiment that is cut along the center of the thickness direction thereof.

A linear guide 130 extends from the left end of the lower portion of the optical fiber holder 10 to the center c of the optical fiber holder 10, and a linear guide 130 extends from the center c to the right end of the optical fiber holder 10.

The optical fiber holder 10 according to the present embodiment includes an optical fiber guide element that guides the optical fiber along its path. The optical fiber guide element may be fabricated in a circular or elliptical shape according to output polarization mode.

A preferred embodiment of the present embodiment discloses an approximately circular-shaped plate 30 as an optical fiber guide element. The plate 30 has a center through hole 34. The circumference of the plate 30 includes an outside surface Da designed to have a specific curvature radius R1, as illustrated in the drawing, and small outside surfaces Db and Db' semi-circularly extended from both sides of the outside surface Da to the outside. The difference between the radii of the virtual circular trajectories of the outside surface Da and each of the outside surfaces Db and Db' may be set to, for example, 6 mm.

The lower end of the outside surface Da communicates with the linear guide 130, and the optical fiber introduced via the linear guide 130 is arranged along the outside surface Da. Accordingly, the optical fiber forms a generally circular loop-shaped coil inside the optical fiber holder 10.

Although omitted in FIG. 2 because the outside surfaces Da and Db and Db' have been cut along the centers thereof, a step or a groove configured to accommodate the optical fiber is formed in the optical fiber guide element, such as a plate.

Meanwhile, the distance between the center of the through hole 34 of the circular plate 30 and the outside surface Da, that is, the distance between the center of the through hole 34 and the optical fiber, may be defined by the curvature radius R1. The curvature radius R1 is a fixed value as long as the size or structure of the optical fiber holder 10 is not changed.

Figure 3:
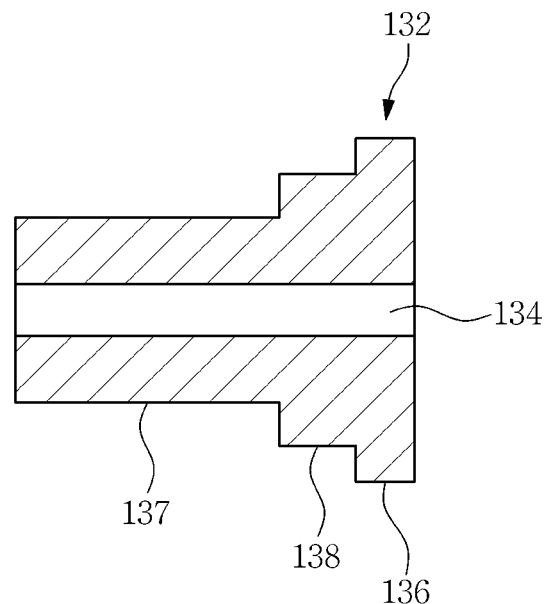
FIG. 3 is a sectional view of each movable member according to the embodiment of the present invention.

Next, referring chiefly to FIGS. 2 and 3, an optical fiber curvature changing unit that is located between the optical fiber and the optical fiber guide element and changes the curvature of the optical fiber by exerting external force to the optical fiber is described.

A pair of slots 32 are formed on the left and right sides of the through hole 34 of the circular plate 30 as guide members according to an embodiment of the present invention. The slots 32 lengthily extend from locations adjacent to the outside surface Db to locations adjacent to the through hole 34. According to an embodiment of the present invention, it is preferred that the height of the slots 32 is about 2.5 mm and the length thereof is 15 mm.

In the illustrated example, movable members 132 according to the present embodiment are inserted into the left and right ends of the slots 32 so that they can slide to the left and the right along the slots 32.

The movable members 132 introduce stress by applying pressure to the optical fiber bent along the curvature radius R1 and formed in the shape of a circular loop-shaped coil, thereby causing double refraction.

FIG. 3 illustrates the sectional view of each of the movable members 132. The movable member 132 includes a head 136, a guide surface 138 in contact with the head 136, and a cylindrical body 137 stepped with respect to the guide surface 138. A lengthy through hole 134 is formed through the center of the movable member 132. It is preferred that the difference between the diameters of the head 136 and the guide surface 138 is, for example, 1 mm. The optical fiber is disposed along the outside surface of the guide surface 138.

In the state in which the outer circumference of the body 137 has passed through the slot 32 and the step portion between the guide surface 138 and the body 137 is caught by and does not pass through the slot 32, an end of the body 137 is fitted into an optical fiber guide holder 204 illustrated in FIG. 2.

The shape and optical fiber contact portion of the movable member 132 according to the present embodiment may be appropriately changed by those skilled in the art as long as the conditions that the movable member 132 is located between the optical fiber and the optical fiber guide element and changes the curvature of the optical fiber by exerting external force onto the optical fiber.

Referring back to FIG. 2, a movable member location changing unit 200 is operatively connected to the optical fiber holder 10 according to the present embodiment. The movable member location changing unit 200 includes a circular plate 202 at the center of which a through hole 208 is formed. Holes are formed on the left and right sides of the circular plate 202, and the other end of a connection member 206 whose one end is inserted into each of the holes is inserted into the through hole 134 of the above-described movable member 132.

Since the pair of connection members 206 are symmetrically formed such that first ends thereof become spaced apart from each other as they approach the optical fiber holder 10. As will be described in conjunction with FIG. 4, the pair of connection members 206 are made to converge or diverge by the operation of the knob 20.

Furthermore, the rotation shaft 14 is inserted in the state in which the center through hole 208 of the circular plate 202 and the through hole 34 of the circular plate 30 are aligned with each other. The rotation shaft 14 is connected to the knob 20. Accordingly, when an operator rotates the knob 20, the circular plate 202 is rotated via the rotation shaft 14, the rotation force of the connection members 206 is transferred to the movable members 132, and thus the movable members 132 linearly moves along the slots 32. Then, the optical fiber contacted on the guide surfaces 138 of the movable members 132 also changes its location linearly along with the movable members 132.

The movable member location changing unit 200 according to the present embodiment may be located behind the optical fiber holder 10, as illustrated in the drawing, or in front of the fiber holder 10. A pair of movable member location changing units 200 having the same structure may be disposed behind and in front of the circular plate 30 in order to achieve stable support. Furthermore, specific part of the movable member location changing unit 200 may be integrated with the circular plate 30 of the optical fiber holder 10.

Figure 4:
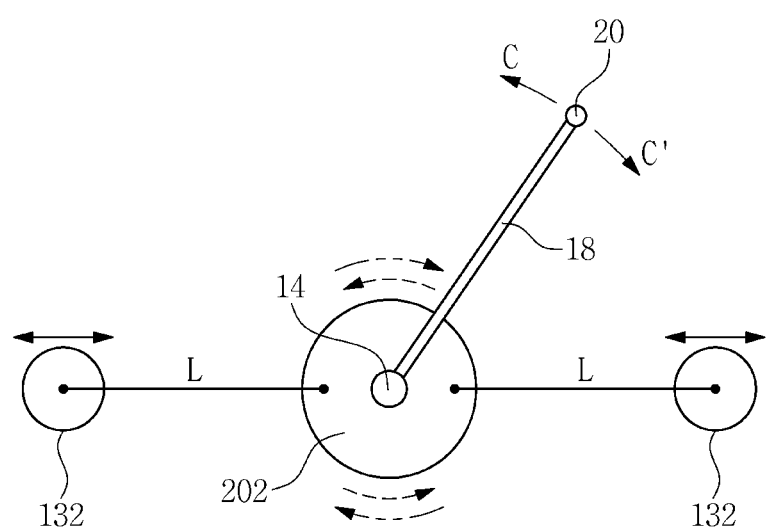
FIG. 4 is a conceptual diagram illustrating the movement of movable members by the operation of a knob according to an embodiment of the present invention.

Referring to the conceptual diagram of FIG. 4, the knob 20 is connected to the rotation shaft 14 via the pair of connection rods 18. When the knob 20 is rotated, the movable members 132 are moved along paths L by the rotation of the circular plate 202 of the movable member location changing unit 200. When the knob 20 is rotated in the counterclockwise direction C of the diagram, the circular plate 202 is rotated along a dotted line direction, the movable members 132 are linearly moved toward the circular plate 202 to converge. In contrast, when the knob 20 is rotated in the counterclockwise direction C' of the diagram, the circular plate 202 is rotated in a two-dot chain line direction, and thus the movable members 132 are linearly moved away from the circular plate 202.

Figure 5:
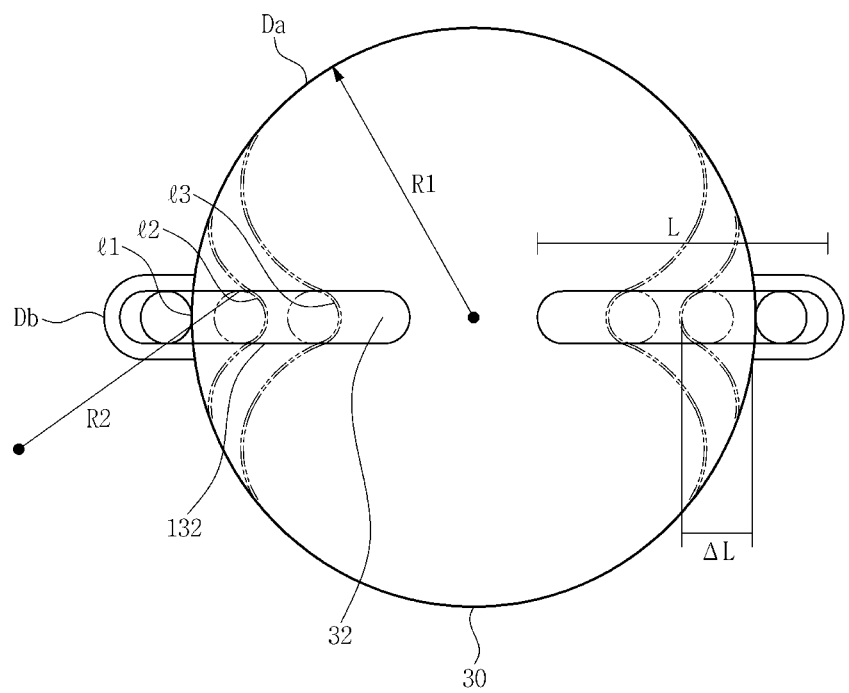
FIG. 5 is a conceptual diagram illustrating a change in the path of an optical fiber by the movement of the movable members according to an embodiment of the present invention.

The conceptual diagram of FIG. 5 illustrates the trajectories of the movement of an optical fiber when the movable members 132 move from initial locations 11 through intermediate locations 12 to final locations 13 via the left and right slots 32 of the circular plate 30.

The movable members 132 bend the optical fiber using pressure varying depending on the type of optical fiber and the wavelength range, in which case the deformed path of the optical fiber may be represented from various points of view, for example, from the point of view of the variable curvature radius R2.

That is, the trajectory of movement of the optical fiber through the slot 32 is represented by the curvature radius R2 in the left slot 32, in which case the curvature radius R2 is a variable value varying depending on the location of the movable member 132 and the curvature radius R2 decreases as the movable member 132 moves to the left of the diagram.

Since the optical fiber forms a loop-shaped coil along the outside surface Da and follows the path of the movable member 132 near the outside surface Db, the overall path of the optical fiber may be viewed as being determined by two factors, that is, the curvature radii R1 and R2.

According to an embodiment of the present invention, it is preferable to perform control such that all polarization states can be represented using a single device for the overall wavelength range passing through a single mode optical fiber by fixing the curvature radius R1 and adjusting the curvature radius R2.

In an embodiment of the present invention, it may be possible to use a change ΔL in the distance of movement along the slot of the movable member 132, instead of the curvature radius R2, as a variable, as illustrated in the right slot 32 of FIG. 5. Since there is a one-to-one correspondence between the change ΔL in the distance of movement and the curvature radius R2, it is appreciated that the same above-described principle is applied.

Figure 6:
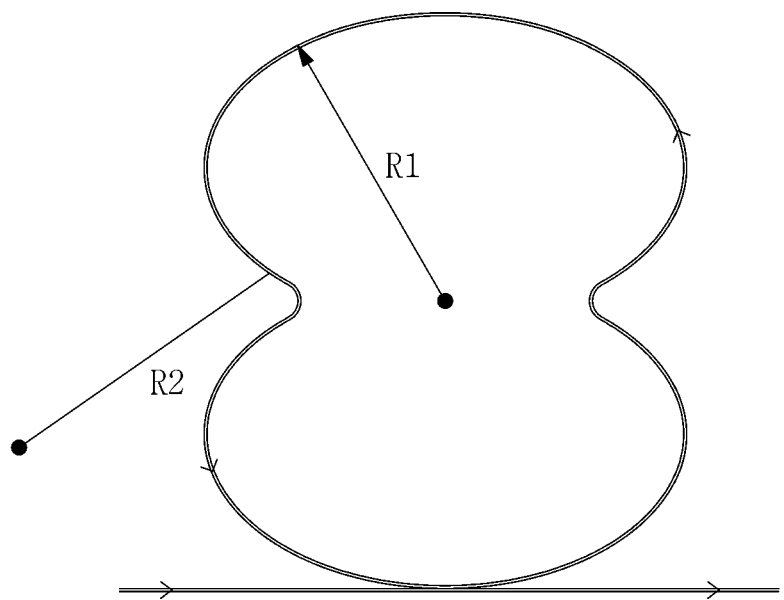
FIG. 6 is a diagram illustrating the overall path of an optical fiber guide according to an embodiment of the present invention.

Referring to FIG. 6, when the paths of an optical fiber based on the device for controlling the polarization of an optical fiber according to the embodiment of the present invention are illustrated, a sequence indicated by the arrows is achieved. An approximately loop-shaped coil is formed between two linear paths, and paths following the curvature radius R2 different from the curvature radius R1 of the loop are formed on both sides of the coil.

Since the material of the optical fiber is subjected to stress while the curvature radius R2 increases or decreases depending on the rotation direction of the knob 20, additional double refraction is applied to the optical fiber to which primary double refraction has been applied to the circular plate 30 of the optical fiber holder 10. Since the size of the additional double refraction can be controlled, the size of the phase difference between polarization components can be adjusted.

Therefore, in accordance with the device 1 for controlling the polarization of an optical fiber according to the present embodiment, the magnitude of overall double refraction may be adjusted by deforming the circular path of an optical fiber and controlling the deformed region, and thus it is possible to adjust a polarization state using a single device for the wide wavelength range passing through the optical fiber. That is, desired output polarization can be acquired using a single device for controlling the polarization of an optical fiber via a small number of stress introduction processes.

Furthermore, as described above, since the optical fiber holder 10 can be rotated around the support axis, an optical fiber based on the device for controlling the polarization of an optical fiber according to the present embodiment is also rotated around the rotation shaft. Accordingly, an operator can easily adjust polarization mode in such a way as to adjust the amount of polarization incident on two axes (slow and fast axes) by adjusting the angle of polarization incident with respect to a double refraction axis and to impart a twist to the optical fiber via the optical fiber supports that support both ends of the optical fiber.

Although the conventional technology determines each amount of rotation by considering relative angles with respect to other wave plates, it is sufficient if the present invention adjusts a single absolute rotation angle as if there were a single wave plate, and thus the effect of further facilitating and improving the convenience of the setting of a rotation angle for an optical fiber through which light having various wavelengths can be expected.

The device for controlling the polarization of an optical fiber according to the present invention can be applied to automation that is intended to compensate for a polarization-related effect that adversely affects a system. Since the polarization state of an optical fiber cable randomly varies over time, an automatic control system that monitors a system and continuously adjusts the device for controlling the polarization of an optical fiber is required to optimally operate the system.

Figure 7:
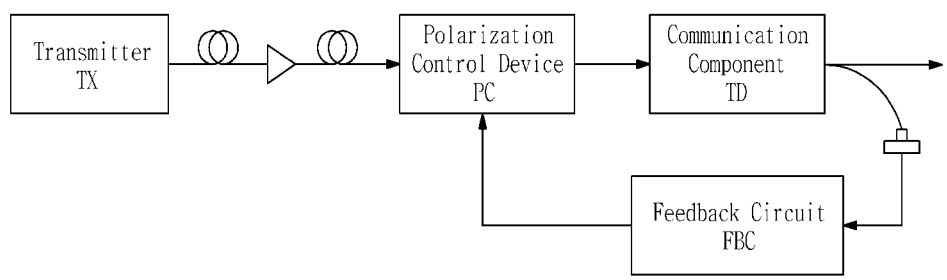
FIG. 7 is a diagram illustrating the configuration of a communication system using a device for controlling the polarization of an optical fiber according to an embodiment of the present invention.
Figure 8:
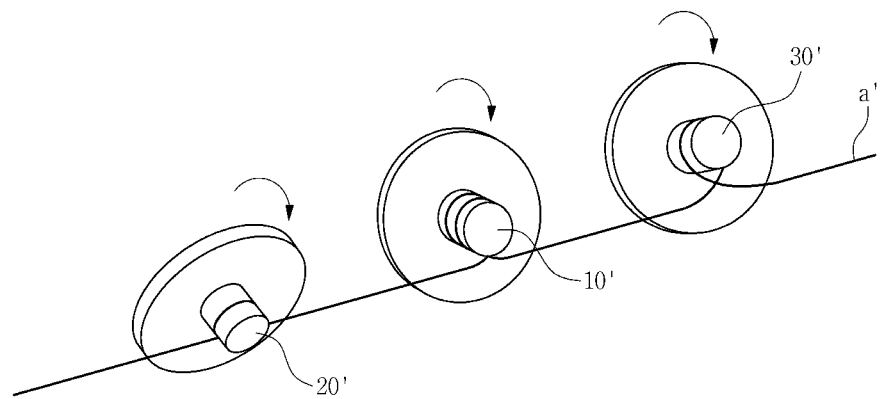
FIG. 8 is a perspective view of a conventional device for controlling the polarization of an optical fiber.

FIG. 7 illustrates an example of a system intended for polarization optimization state. When light having passed through a Tx transmitter passes through communication components TD suffering from polarization loss, such as a wavelength multiplexer and a receiver, after passing through the device for controlling the polarization of an optical fiber (a PC) according to the embodiment of the present embodiment, the system is configured to monitor optical output and control the device for controlling the polarization of an optical fiber PC using a feedback circuit FBC in real-time in order to compensate polarization loss.

In this case, when information about various optical fibers and wavelength ranges is organized in a database, a curvature radius and/or a change in the distance of movement are set as target variables, calibration is performed and then settings are made, an automatic system can be constructed in place of the manual operation of an operator.

Furthermore, in the present invention, as another embodiment of the movable members of the optical fiber curvature changing unit, rods that are operated to reciprocate, to protrude or to perform avoidance movement by an actuator that is driven in response to electrical signals. This case may be more advantageous for the implementation of the automation of the control of a driving source.

Although the present invention has been described with reference to the preferred embodiments, this is illustrative, and the shapes, locations, arrangements and numbers of elements and components of the present invention may be appropriately changed by a person skilled in the art.

For example, regions where additional loops are formed may be arranged in the upper and lower sides of the diagram or three or more portions, rather than the left and right sides of the diagram. Furthermore, the relationship between the movement of the slot and the movement of the movable members for adjusting the curvature radius of the optical fiber and the transfer of force from the knob to the movable members may be changed or replaced in terms of mechanics or dynamics as desired. It will be apparent that these also pertain to the range of rights of the present invention.

The present invention described above has the following advantages.

The present invention provides an integrated, new, inventive device for controlling the polarization of an optical fiber, which is capable of stably and intuitively controlling the polarization of light that propagates inside a wide variety of types of optical fibers.

Furthermore, the present invention can achieve excellent work efficiency because any type of desired output polarized light can be obtained using a single device for controlling the polarization of an optical fiber through a small number of bending steps.

Furthermore, the present invention provides a small-sized, compact device for controlling the polarization of an optical fiber compared to the conventional technology, and has excellent marketability and economic efficiency because the length of required optical fibers is not long.

Furthermore, the present invention has excellent durability because a squeezing method is not applied to an optical fiber.

Furthermore, according to the present invention, it is possible to construct a system in which information about various types of optical fibers and wavelength ranges are organized in a database, so that the process of generating double refraction can be easily automated and feedback can be provided.

The advantages of the present invention described above are only representative ones, and it will be apparent that the advantages of the present invention are not limited thereto.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A device for controlling polarization of an optical fiber, comprising:
   optical fiber supports configured to receive an optical fiber and support both ends of the optical fiber;
   an optical fiber holder configured to include an optical fiber guide element that guides the optical fiber, drawn out of the optical fiber supports, through a path; and
   an optical fiber curvature changing unit located between the optical fiber and the optical fiber guide element, and configured to change a curvature of the optical fiber by exerting external force onto the optical fiber in a direction perpendicular to the extension direction of the optical fiber,
   wherein the optical fiber holder has slots intersecting the path of the optical fiber, and
   the optical fiber curvature changing unit comprises movable members that are inserted into the slots and are movable along shapes of the slots.

2. The device of claim 1, wherein the optical fiber curvature changing unit comprises rods inserted into the optical fiber guide elements and configured to protrude.

3. The device of claim 1, wherein the optical fiber curvature changing unit further comprises:
   connection members configured such that first ends thereof are connected to the movable members, respectively; and
   a movable member location changing unit connected to second ends of the connection members, and configured to move the movable members by changing locations of the connection members.

4. The device of claim 1, wherein the optical fiber guide element is formed in a circular or elliptical shape.

5. The device of claim 1, wherein the optical fiber holder further comprises rotation pins that connect the optical fiber supports and the optical fiber holder and are rotatable around a support axis of the optical fiber supports.

6. A communication system, comprising:
   a device for controlling polarization of an optical fiber, comprising:
   optical fiber supports configured to receive an optical fiber and support both ends of the optical fiber;
   an optical fiber holder configured to include an optical fiber guide element that guides the optical fiber, drawn out of the optical fiber supports, through a path; and
   an optical fiber curvature changing unit located between the optical fiber and the optical fiber guide element, and configured to change a curvature of the optical fiber by exerting external force onto the optical fiber in a direction perpendicular to the extension direction of the optical fiber;
   a transmitter;
   one or more communication components subjected to suffering from polarization loss;
   a monitoring device configured to monitor optical output that passes the communication components; and
   a feedback circuit configured to receive a signal from the monitoring device and control the device for controlling the polarization of an optical fiber based on the signal,
   wherein the optical fiber holder has slots intersecting the path of the optical fiber,
   the optical fiber curvature changing unit comprises movable members that are inserted into the slots and are movable along shapes of the slots, and
   the device for controlling the polarization of an optical fiber organizes types of optical fibers and wavelength ranges in a database, sets a curvature radius and/or a change in a distance of movement as variables, and then performs an operation.

7. The communication system of claim 6, wherein the optical fiber curvature changing unit further comprises:
   connection members configured such that first ends thereof are connected to the movable members, respectively; and
   a movable member location changing unit connected to second ends of the connection members, and configured to move the movable members by changing locations of the connection members.

8. The device of claim 1, wherein the optical fiber guide element has a step configured to accommodate the optical fiber.

9. The system of claim 6, wherein the optical fiber guide element has a step configured to accommodate the optical fiber.

* * * * *